Figure 1:
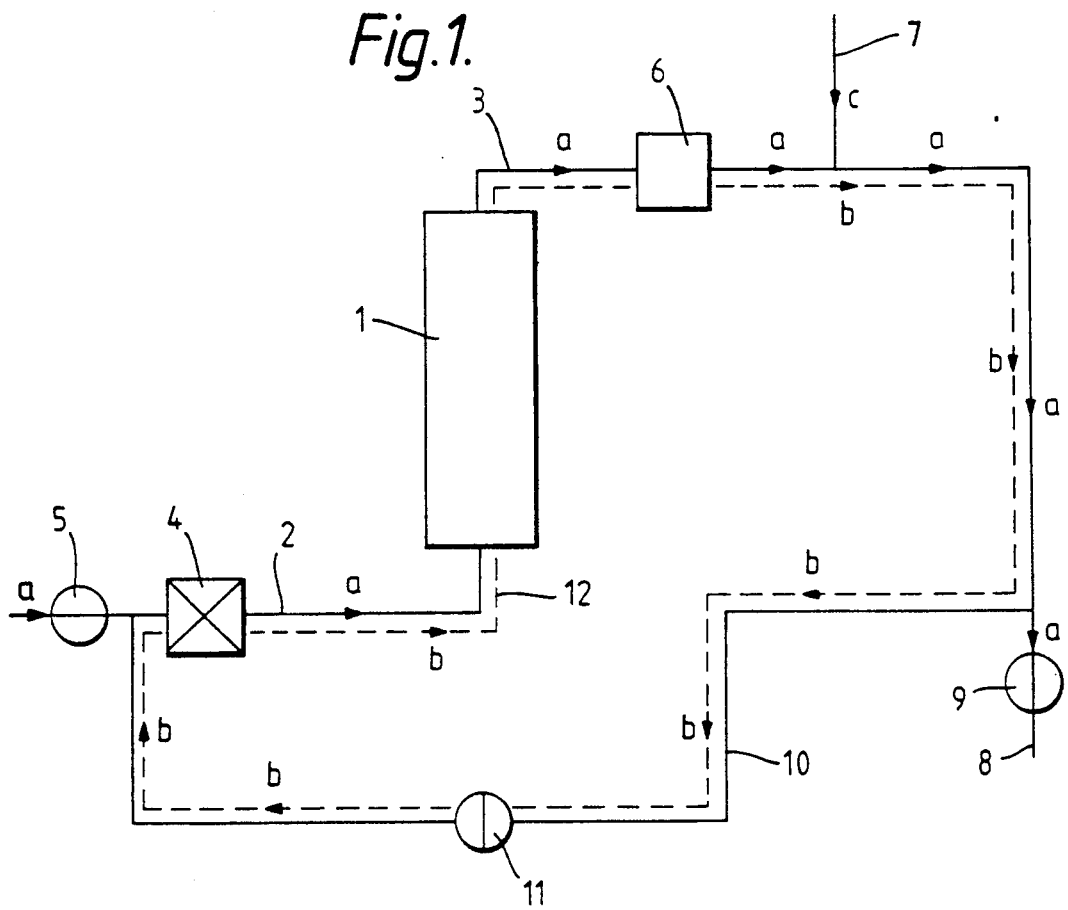

United States Patent [19]
Bridger et al.

[11] Patent Number: 5,225,056
[45] Date of Patent: Jul. 6, 1993

[54] SEPARATION METHOD

[75] Inventors: Nevill J. Bridger, Hermitage; Mark D. Neville, Stanford-in-the-Vale; Andrew D. Turner, Abingdon, all of United Kingdom

[73] Assignee: United Kingdom Atomic Energy Authority, Harwell, England

[21] Appl. No.: 648,874

[22] Filed: Jan. 31, 1991

[30] Foreign Application Priority Data

Feb. 1, 1990 [GB] United Kingdom ................. 9002244
Feb. 1, 1990 [GB] United Kingdom ................. 9002245

[51] Int. Cl.$^5$ .............................................. C25F 7/00
[52] U.S. Cl. .................... 204/149; 204/182.3; 204/130
[58] Field of Search ................ 204/149, 130, 182.3

[56] References Cited

U.S. PATENT DOCUMENTS 3,042,597  7/1962  Schumacher ................. 204/180
3,484,188  12/1969  Schneider ..................... 204/98
3,533,929  10/1970  Evans ........................... 204/149

FOREIGN PATENT DOCUMENTS 1312681  4/1973  United Kingdom .
2150597  7/1985  United Kingdom .
2178759  2/1987  United Kingdom .
2187761  9/1987  United Kingdom .

Primary Examiner—John Niebling
Assistant Examiner—Arun S. Phasge
Attorney, Agent, or Firm—William R. Hinds

[57] ABSTRACT

A first metal, for example a transition metal such as cobalt, having an insoluble hydroxide is separated from a second metal such as lithium having a soluble hydroxide in an aqueous liquid containing dissolved cations of the metals. The cations are firstly absorbed onto a cation exchange material by electrochemical ion exchange and the second metal then selectively eluted by electrochemical ion exchange under sufficiently high pH conditions, e.g. to 10-13, in a closed loop. Finally, the transition metal is eluted by electrochemical ion exchange under sufficiently low pH conditions, e.g. acidic such as 1-2. The method is applicable to separating trace quantities of Co (e.g. as Co-60) from larger quantities of Li in aqueous solution.

10 Claims, 1 Drawing Sheet

SEPARATION METHOD

This invention relates to a method of separating metals in an aqueous liquid containing the metals.

The electrochemical removal of ions from aqueous solutions onto ion-exchange materials, which may be referred to as electrochemical ion exchange or electrochemical deionization, is known for example from UK patents GB 1 247 732, GB 2 150 598, and GB 2 187 761. It involves establishing an electrochemical cell comprising the aqueous solution as electrolyte, a working electrode and a counter electrode, where at least the working electrode incorporates an ion exchange material such as a resin, and applying a D.C. voltage between the electrodes. To remove cations from the solution the working electrode incorporates a cation responsive ion exchange material and is made the cathode. A localised change of pH occurs at the electrode due to generation of OH$^-$ ions which in turn produce active sites thereon for absorption of cations from the aqueous solution. Subsequent reversal of the voltage enables the absorbed ions to be eluted, so the working electrode can be readily regenerated.

The present invention is concerned with using electrochemical ion exchange to separate metal ions in solution, whose hydroxides have different solubilities in water, and may also be applicable where the metals are present in suspension. Thus, the invention provides a method of separating a first metal, which has a water insoluble hydroxide, from a second metal, which has a water soluble hydroxide, in an aqueous liquid containing said metals, the method comprising the following steps in sequence:

(i) electrochemically absorbing said metals from the aqueous liquid onto a cation exchange material, the liquid acting as electrolyte in a cell with two electrodes at least one of which incorporates the said cation exchange material;

(ii) electrochemically eluting the second metal from the cation exchange material by contact with an aqueous electrolyte under conditions such that the pH of the electrolyte is sufficiently high that the first metal remains absorbed on the cation exchange material and the second metal is desorbed into the electrolyte; and (iii) subsequently electrochemically eluting the first metal from the cation exchange material by contacting with an aqueous electrolyte under conditions such that the pH of the electrolyte is sufficiently low to allow said first metal to be desorbed.

The invention has been found to be particularly effective in separating cobalt from lithium in an aqueous liquid containing cobalt and lithium in solution. Such a liquid may, for example, be a waste liquid arising from the operation of a pressurised water reactor, where there may be a requirement to separate trace quantities of cobalt-60 from lithium. In this situation it has been found that a substantial part of the cobalt may be in a colloidal or particulate form (which could be removed by filtration), but nevertheless the process of the invention has been effective. The method is particularly suitable where the first metal is present in trace quantities (for example less than 1 ppm); with significantly higher concentrations the hydroxide of the first metal may precipitate out onto the working electrode, which has a detrimental effect on the ion exchange process. The invention is not, however, to be regarded as restricted to the nuclear field or to separation of the above-mentioned specific elements. Thus, examples of other first metals to which the invention may be applicable are transition metals, lanthanides, and actinides, amongst others, having water-insoluble hydroxides, for example silver, manganese, chromium, niobium, zinc and antimony; and calcium. Examples of other second metals to which the invention may be applicable are those of Group 1A of the Periodic Table such as sodium. Also, the invention is applicable to separating one or more first metals from one or more second metals contained in the aqueous liquid.

Each step is preferably performed while causing the respective electrolytes to flow through the cell. During step (ii) the pH of the eluting solution tends to rise because of the generation of hydroxyl ions, as illustrated in the equation below showing the overall reaction during elution, the cation exchange material being represented as X and the second metal being lithium:

$$X\text{-Li} + H_2O \rightarrow X\text{-H} + OH^- + Li^+$$

A sufficiently high pH may be achieved by recirculating the electrolyte through the cell. The pH of the eluting solution is allowed to rise to a pH greater than 7, for example within the range from 10 to 13, preferably greater than 11. Under such conditions, the second metal, because its hydroxide is water-soluble, is desorbed from the cation exchange material whereas the first metal, because its hydroxide is water-insoluble, remains absorbed on the cation exchange material. For example cobalt ions are not eluted even if the electrolyte has a pH of 7. The eluting solution, in which the second metal is dissolved, may then be removed. An alternative way of attaining the high pH in step (ii) is to add an alkali such as LiOH.

Alternatively steps (i) and (ii) may both be performed with an electrolyte of high pH, the polarity of the voltage applied to the ion exchange cell being repeatedly reversed so steps (i) and (ii) occur alternately. Preferably the rate of flow of the liquid and the rate of reversal of polarity are such that cations of the second metal are subjected to a plurality of absorption/desorption cycles at the working electrode. If desired, both electrodes in the cell may incorporate cation exchange material. The high pH may be achieved by first subjecting the aqueous liquid to electrochemical anion exchange.

During step (iii) the pH may be controlled to be substantially below 7 by means of additions of an acid and use, for example, of a pH-stat. It may, for example, be controlled to be no greater than 3, for example between 1 and 2. Desorption of electrochemical anion exchange material is an alternative way of generating an acidic pH in step (iii).

Examples of cation exchange materials that may be used are zeolites, titanium phosphate, zirconium phosphate, and AMBERLITE (Registered Trade Mark) IRC 50 and 84 (ex Rohm and Haas). Preferably, the material can be in powder form, so it is easier to make the electrode. Where the ion for extraction is radioactive, the ion exchange material is preferably inorganic since inorganic materials are less likely to be affected by radiation than organic materials. The choice of ion exchange material is also determined in practice by the material's selectivity for the ion to be removed.

Figure 2:
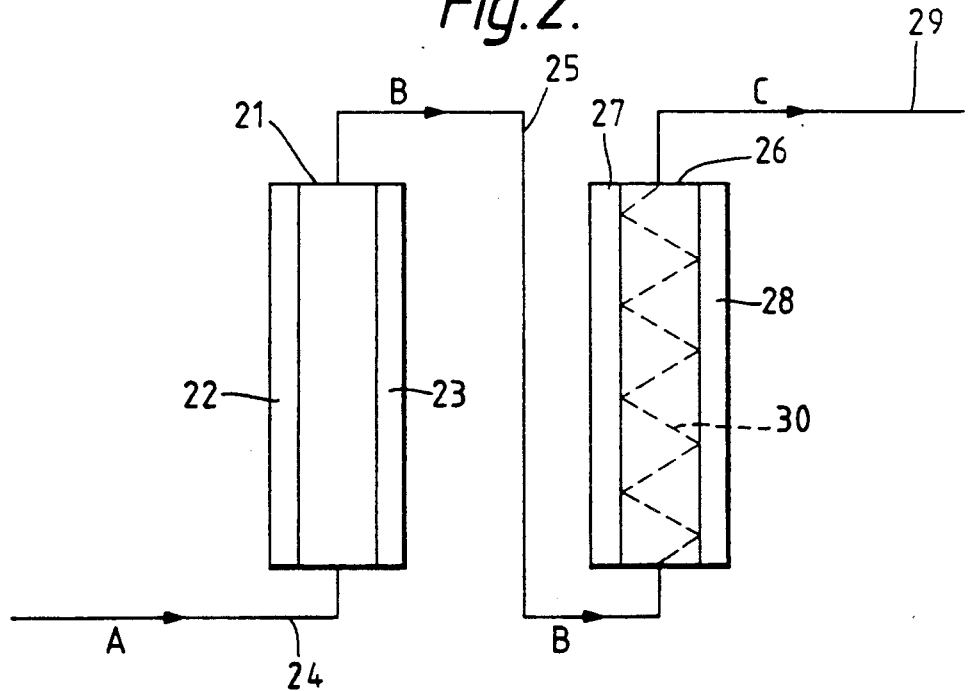

The invention will now be particularly described, by way of example only, and with reference to the accompanying drawings, in which:

FIG. 1 a schematic diagram of an apparatus for separating ions of two different metals; and FIG. 2 shows a schematic diagram of an alternative apparatus for separating ions of two different metals.

Referring to FIG. 1, an electrochemical ion exchange cell 1 (in which are a working electrode including a cation exchange material, and a counter electrode (electrodes not shown)) has a liquid inlet 2 and a liquid outlet 3. The inlet 2 has a peristaltic pump 4 and valve 5. The outlet 3 has a pH measuring module 6 and an acid supply line 7. The outlet 3 sub-divides into an exit line 8 having a valve 9 and a return line 10 having a valve 11. The return line 10 feeds to the liquid inlet 2 between the peristaltic pump 4 and the valve 5.

In operation of the apparatus of FIG. 1 the following steps are performed:

(i) With valves 5 and 9 open and valve 11 closed, liquid to be treated, in which cations of a first metal and a second metal are dissolved, is fed through the cell 1 and through the exit line 8 in the direction shown by the arrows a to waste. The voltage applied to the electrodes in the cell 1 is such that the working electrode is the cathode; cations are therefore absorbed.

(ii) With valves 5 and 9 closed, valve 11 open and no acid supply from supply line 7, liquid electrolyte is circulated in a closed loop as shown by the dotted line 12 and arrows b. The polarity of the applied voltage is reversed, and so the pH rises, and the second metal is eluted from the working electrode in the cell 1, while the first metal remains absorbed. The resulting electrolyte containing the second metal is then removed.

(iii) With valves 5 and 9 closed, valve 11 open and with acid supplied from the supply line 7 as shown by arrow c in response to information supplied by the pH module 6, liquid electrolyte is circulated in the closed loop as shown by the dotted line 12 and arrows b. The pH is controlled to be well below 7 by the addition of the acid and the first metal is eluted from the cell 1. The resulting electrolyte containing the first metal is then removed.

EXAMPLE

An electrochemical ion exchange cell was used comprising two working electrodes each containing 85% by weight of zirconium phosphate ($Zr(HPO_4)_2$) cation exchange material (65 g; ex Magnesium Elektron) bound by a styrene-butadiene binder, and with platinised titanium current feeders, and two platinised titanium mesh counter electrodes, mounted in a polymethylmethacrylate flow cell so that electrolyte could flow through the cell and contact the electrodes. The effective surface area of each electrode was 161 cm$^2$(5.5 cm wide $\times$ 29.2 cm high).

The cell 1 was incorporated into an apparatus as shown in the figure and a feed solution comprising $Co(NO_3)_2$ (0.1 ppm Co) and LiOH (1.0 ppm Li) treated by operation of the apparatus as described above. The current density used was 3 mA/cm$^2$ in each step, and in steps (ii) and (iii) the closed volume of the loop was 300 ml. In step (ii) the pH was 11-12 and in step (iii) the pH was controlled by nitric acid to be 1.5-2.5. Cobalt concentration was sampled periodically in the closed loop. Step (ii) took place for just over 4 hours, in which time the cobalt concentration remained stable at about 0.02 ppm, while the lithium concentration rose from 0.1 ppm to 4 ppm. The cobalt concentration rose rapidly to above 0.4 ppm in step (iii); experimental results show that this can be in excess of 200 ppm.

It will be appreciated that after eluting the lithium ions in step (ii), step (i) may he repeated to absorb Li and Co cations from a further quantity of feed solution, until the working electrode is again fully loaded. These two steps (i) and (ii) may be repeated alternately until the working electrode has absorbed sufficient cobalt ions to make elution of the cobalt (step (iii)) worthwhile.

Referring now to FIG. 2, an electrochemical anion exchange cell 21 has two electrodes 22 and 23, each including anion exchange material. The cell 21 has an inlet 24 and an outlet 25 for liquid undergoing treatment. The outlet 25 communicates with and feeds to an electrochemical cation exchange cell 26 having two electrodes 27 and 28, each including cation exchange material. The cell 26 has an outlet 29 for liquid. Also, the cell 26 has a switching means (not shown) for alternating the polarity of the voltage applied between the electrodes 27 and 28 repeatedly, i.e. so that the polarity of each electrode 27 and 28 can be alternated as a function of time.

In operation of the apparatus of FIG. 2, liquid to be treated, in which cations of a first metal and a second metal are dissolved, is fed through the inlet 24 in the direction shown by arrow A into the cell 21 across which a voltage is applied. The anions in the liquid are exchanged with those of the anion exchange material at the electrodes 22 and 23 to generate hydroxyl ions and raise the pH of the liquid. The liquid then passes from the cell 21 via the outlet 25 and enters the cell 26 in the direction shown by arrows B. The polarity of the applied voltage is repeatedly alternated by the switching means so that cations of the second metal in the liquid are repeatedly absorbed and desorbed at each of the electrodes 27 and 28 as shown by the dotted line 30. The cations of the first metal in the liquid are absorbed at each of the electrodes 27 and 28 but not desorbed. The liquid from which the first metal cations have been removed and in which second metal cations remain leaves cell 26 via outlet 29 in the direction shown by arrow C.

EXAMPLE

An aqueous feed solution of pH about 7 in which are dissolved 0.1 ppm of cobalt as $Co(NO_3)_2$ and 10 ppm of lithium as $LiNO_3$ was subjected to the procedure described above where the anion exchange material was a material sold commercially as AMBERLITE IRN 78L (ex Rohm and Haas) and the cation exchange material was zirconium phosphate (ex Magnesium Elektron). The pH of the liquid leaving the cell 21 was 11.3 by virtue of anion exchange according to the following reaction:

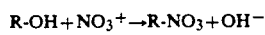

where R-OH represents the anion exchange material. The flow rate was 0.06 liter/hour and the cell 26 was anodic for 20 seconds and cathodic for 10 seconds in order to match the pH of the liquid entering the cell 26 with that of the liquid leaving the cell 26. The current density at the electrodes 27 and 28 was 3mA/cm$^2$, each having a surface area of 321 cm$^2$. Analysis of the liquid leaving the cell 26 showed the lithium concentration to be 9 ppm, i.e. little lithium had been lost in the process, whereas the decontamination factor (DF) for the cobalt, i.e. the ratio of its concentrations before and after the treatment, was 188.

We claim:

1. A method of separating a first metal, which has a water insoluble hydroxide, from a second metal, which has a water soluble hydroxide, in an aqueous liquid containing said metals, the method comprising the following steps in sequence:
   (i) electrochemically absorbing said metals from the aqueous liquid onto a cation exchange material, the liquid acting as electrolyte in a cell with two electrodes at least one of which incorporates the said cation exchange material;
   (ii) electrochemically eluting the second metal from the cation exchange material by contact with an aqueous electrolyte under conditions such that the pH of the electrolyte is sufficiently high that the first metal remains absorbed on the cation exchange material and the second metal is desorbed into the electrolyte; and
   (iii) subsequently electrochemically eluting the first metal from the cation exchange material by contacting with an aqueous electrolyte under conditions such that the pH of the electrolyte is sufficiently low to allow said first metal to be desorbed.

2. A method as claimed in claim 1 wherein each step is performed while causing the respective electrolytes to flow through the cell.

3. A method as claimed in claim 1 wherein in step (ii) the high pH is achieved by recirculating the electrolyte through the cell.

4. A method as claimed in claim 1 wherein steps (i) and (ii) are repeated alternately a plurality of times, before performing step (iii).

5. A method as claimed in claim 1 wherein steps (i) and (ii) are both performed with an electrolyte of pH sufficiently high for step (ii), the polarity of the voltage applied to the cell being repeatedly reversed so steps (i) and (ii) occur alternately.

6. A method as claimed in claim 5 wherein the rate of flow of the liquid and the rate of reversal of polarity are such that cations of the second metal are subjected to a plurality of absorption/desorption cycles at the working electrode during a single passage through the cell.

7. A method as claimed in claim 5 wherein both electrodes incorporate cation exchange material.

8. A method as claimed in claim 5 wherein the high pH is achieved by first subjecting the aqueous liquid to electrochemical anion exchange.

9. A method as claimed in claim 1 wherein during step (iii) the pH is controlled to be substantially below 7 by additions of an acid.

10. A method as claimed in claim 1 wherein during step (iii) the pH is controlled to be no greater than 3.

* * * * *